US00RE46114E

(19) United States
(12) Reissued Patent
Yellin et al.

(10) Patent Number: US RE46,114 E
(45) Date of Reissued Patent: Aug. 16, 2016

(54) INSERTION POINTS FOR STREAMING VIDEO AUTOPLAY

(71) Applicant: NETFLIX, INC., Los Gatos, CA (US)

(72) Inventors: Todd Scot Yellin, Los Gatos, CA (US); Michael Thomas Hastings, San Francisco, CA (US); Thomas Purnell-Fisher, Los Gatos, CA (US); Greg Peters, San Francisco, CA (US)

(73) Assignee: NETFLIX Inc., Los Gatos, CA (US)

(21) Appl. No.: 14/550,791

(22) Filed: Nov. 21, 2014

Related U.S. Patent Documents

Reissue of:
(64) Patent No.: 8,689,269
Issued: Apr. 1, 2014
Appl. No.: 13/015,469
Filed: Jan. 27, 2011

(51) Int. Cl.
*H04N 21/234* (2011.01)
*H04N 21/44* (2011.01)
*H04N 21/25* (2011.01)
(Continued)

(52) U.S. Cl.
CPC ..... *H04N 21/234* (2013.01); *H04N 21/44* (2013.01); *H04N 21/23418* (2013.01); *H04N 21/251* (2013.01); *H04N 21/44222* (2013.01); *H04N 21/482* (2013.01)

(58) Field of Classification Search
CPC ..... H04N 21/234; H04N 21/23418; H04N 21/251; H04N 21/44; H04N 21/44222; H04N 21/482
USPC ..... 725/105; 709/231
See application file for complete search history.

(56) References Cited

U.S. PATENT DOCUMENTS 5,752,160 A * 5/1998 Dunn ..... H04N 5/44543 348/E5.105
6,907,570 B2 * 6/2005 Amir et al. ..... 715/720
7,006,606 B1 * 2/2006 Cohen et al. ..... 379/88.18
(Continued)

FOREIGN PATENT DOCUMENTS

JP 2006033057 A 2/2006
JP 2007208936 A 8/2007
(Continued)

OTHER PUBLICATIONS

"New Feature: Embed videos with a specific start point", Mar. 21, 2007, In Google Video Blog [online], [retrieved on Jul. 31, 2013]. Retrieved from the internet: <http://web.archive.org/web/20070321030204/http: //googlevideo.blogspot.com/2006/08new-feature-embed-videos-with-specific.html>.
(Continued)

*Primary Examiner* — Dennis Bonshock
(74) *Attorney, Agent, or Firm* — Artegis Law Group, LLP

(57) ABSTRACT

Techniques are described for presenting streaming media content to users in an engaging manner. A streaming media player may provide an interface that allows users to browse though a collection of available titles sorted into different categories (e.g., science fiction titles, television shows, westerns, etc.). The interface may be configured to automatically begin playback of one of the media titles at a designated insertion point, providing a user with a preview of the title. The insertion point itself may be selected as an interesting point in a given title, and therefore, likely to engage a user in that title.

18 Claims, 7 Drawing Sheets

(51) Int. Cl.
*H04N 21/442* (2011.01)
*H04N 21/482* (2011.01)

(56) References Cited

U.S. PATENT DOCUMENTS

| | | | | |
|---|---|---|---|---|
| 7,281,220 | B1 | 10/2007 | Rashkovskiy | |
| 7,444,419 | B2 * | 10/2008 | Green | 709/231 |
| 8,307,392 | B2 * | 11/2012 | Ahanger et al. | 725/36 |
| 2002/0146234 | A1 * | 10/2002 | Mizuno | 386/46 |
| 2002/0170067 | A1 * | 11/2002 | Norstrom et al. | 725/109 |
| 2003/0163815 | A1 * | 8/2003 | Begeja et al. | 725/46 |
| 2004/0221322 | A1 * | 11/2004 | Shen et al. | 725/135 |
| 2005/0005308 | A1 | 1/2005 | Logan et al. | |
| 2005/0038877 | A1 | 2/2005 | Gupta et al. | |
| 2005/0125838 | A1 | 6/2005 | Wang et al. | |
| 2006/0064716 | A1 * | 3/2006 | Sull et al. | 725/37 |
| 2006/0107295 | A1 | 5/2006 | Margis et al. | |
| 2006/0212904 | A1 * | 9/2006 | Klarfeld et al. | 725/46 |
| 2006/0218617 | A1 * | 9/2006 | Bradstreet et al. | 725/135 |
| 2007/0290876 | A1 * | 12/2007 | Sato et al. | 340/825.22 |
| 2008/0092168 | A1 * | 4/2008 | Logan et al. | 725/44 |
| 2008/0097970 | A1 * | 4/2008 | Olstad et al. | 707/3 |
| 2008/0127258 | A1 * | 5/2008 | Walker et al. | 725/39 |
| 2008/0127270 | A1 * | 5/2008 | Shipman et al. | 725/46 |
| 2008/0155609 | A1 * | 6/2008 | Lee | 725/62 |
| 2008/0155616 | A1 * | 6/2008 | Logan et al. | 725/93 |
| 2008/0307454 | A1 | 12/2008 | Ahanger et al. | |
| 2008/0320159 | A1 * | 12/2008 | Naimark et al. | 709/231 |
| 2009/0007202 | A1 * | 1/2009 | Williams et al. | 725/105 |
| 2009/0019489 | A1 | 1/2009 | Ohlfrs et al. | |
| 2009/0070814 | A1 * | 3/2009 | Kim | H04H 20/38 |
| | | | | 725/40 |
| 2009/0083790 | A1 * | 3/2009 | Wang et al. | 725/38 |
| 2009/0100462 | A1 * | 4/2009 | Park et al. | 725/38 |
| 2009/0110363 | A1 * | 4/2009 | Kim et al. | 386/46 |
| 2009/0265737 | A1 * | 10/2009 | Issa et al. | 725/38 |
| 2009/0287790 | A1 | 11/2009 | Upton et al. | |
| 2010/0095319 | A1 * | 4/2010 | Tran et al. | 725/14 |
| 2010/0095329 | A1 * | 4/2010 | Tran et al. | 725/61 |
| 2010/0095345 | A1 * | 4/2010 | Tran et al. | 725/131 |
| 2010/0161825 | A1 | 6/2010 | Ronca et al. | |
| 2010/0293584 | A1 * | 11/2010 | Civanlar et al. | 725/109 |
| 2010/0333143 | A1 * | 12/2010 | Civanlar et al. | 725/54 |
| 2011/0145726 | A1 * | 6/2011 | Wei et al. | 715/752 |
| 2011/0265125 | A1 * | 10/2011 | Rashkovskiy | 725/60 |
| 2011/0314502 | A1 * | 12/2011 | Levy et al. | 725/60 |
| 2012/0084826 | A1 * | 4/2012 | Xu et al. | 725/109 |

FOREIGN PATENT DOCUMENTS

| | | | |
|---|---|---|---|
| WO | 2005055604 | A1 | 6/2005 |
| WO | 2005086471 | A1 | 9/2005 |

OTHER PUBLICATIONS

Yang, Brian, "Useful YouTube URL Tricks", Aug. 21, 2010, In tech Airlines [online], [retrieved on Mar. 20, 2013], Retreived from the Internet: <http://web.archive.org/web/20100823232143/http:www.techairlines.com/2010/08/21/useful-youtube-url-tricks/>.

European Search Report dated Jul. 15, 2014 in Application No. 12 73 9582.

International Search Report PCT/US12/022746 dated May 11, 2012.

* cited by examiner

INSERTION POINTS FOR STREAMING VIDEO AUTOPLAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

Embodiments presented in this disclosure generally relate to streaming media services. More specifically, embodiments presented herein relate to techniques for providing a streaming video autoplay feature based on insertion points specified for a group of selected streaming video titles.

BACKGROUND

Streaming media services include a content server, a content player, and a communications network connecting the content server to the content player. The content server is configured to store media files (or "streams") made available to end users. Each stream may provide a digital version of a movie, a television program, a sporting event, a staged or live event captured by recorded video, etc. Streams also include media content created specifically for distribution online. Content files stored on the content server are typically organized according to playback chronology and store audio data and/or video data.

Media playback by a client device is typically referred as "streaming" because the content server transmits portions of a media file to the client device, which in turn decodes and initiates playback on the a client device without waiting for the complete stream to be received. To account for variable latency and bandwidth within the communications network, a content buffer on the client device queues incoming portions of the stream ahead of the portions actually being played. During moments of network congestion (which leads to lower available bandwidth) less data is added to the buffer, which may drain down as data is being de-queued to support playback at a certain playback bit rate. However, during moments of high network bandwidth, the buffer is replenished and additional buffer time is added until the buffer is generally full again. In practical systems, the buffer may queue data corresponding to a time span ranging from seconds to more than a minute.

Streaming digitally encoded audiovisual (AV) programs (including feature length films and television programs) over the Internet has become popular as the availability of high-bandwidth Internet communication has increased, and a variety of different streaming media protocols are available for transmitting media streams to the client. Although many of these protocols were designed to transmit media streams from a server to a conventional computing system, e.g., a typical desktop PC or laptop computer, or home theatre PC (HTPC), the streaming approach is also being used to transmit streaming media to a variety of end-user client devices; including, e.g., mobile telephones, tablet and net-book computing devices, console and handheld video game systems, digital video recorders (DVRs), DVD players, connected digital TVs, and dedicated media streaming devices, (e.g., the Roku® set-top box), etc.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1:
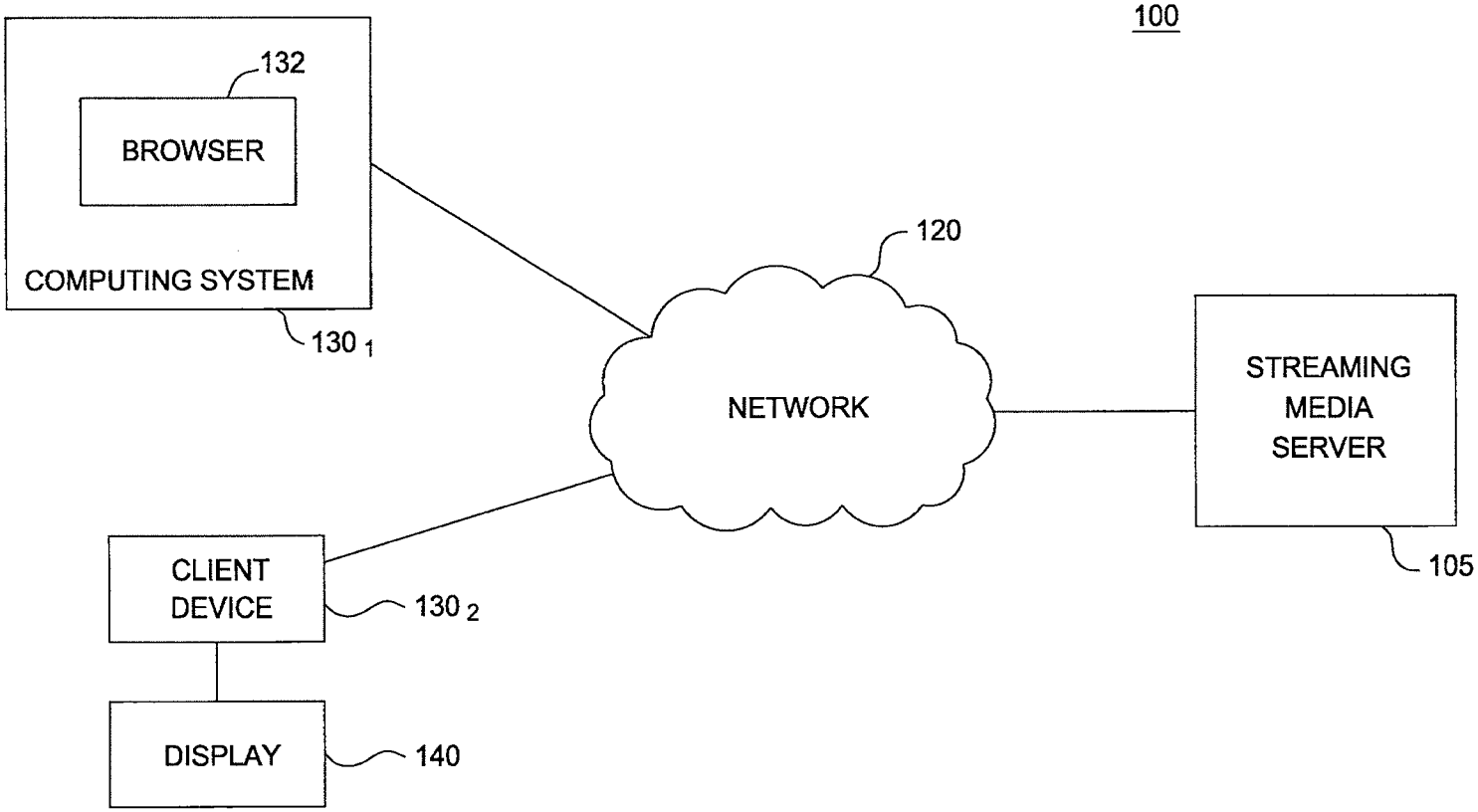
FIG. 1 illustrates an example computing infrastructure used to provide streaming media to a variety of client systems, according to one embodiment of the invention.

Embodiments of the invention provide herein relate to techniques presenting streaming media content to users in an engaging manner. One embodiment provides a method for delivering streaming media content to a client device. The method may generally include identifying a selection of media titles to present to a user via an autoplay interface presented on the client device, identifying, for a first one of the media titles, a first insertion point that specifies a frame from which to begin streaming the first media title to the client device via the autoplay interface, and streaming the first media title to the client device from the first insertion point.

Other embodiments include, without limitation, a computer-readable medium that includes instructions that enable a processing unit to implement one or more aspects of the disclosed methods as well as a system configured to implement one or more aspects of the disclosed methods.

Description of Example Embodiments

Embodiments of the invention provide techniques for presenting streaming media content to users in an engaging manner. In one embodiment, a user-interface on a content-publisher website (or interface provided by a cable set-top-box or DVR) may include a control that allows the user to select to begin previewing available titles in an autoplay mode. For example, in one embodiment, a streaming media player may provide an interface that allows users to browse though a collection of available titles sorted into different categories (e.g., science fiction titles, television shows, westerns, etc.). The interface may be configured to automatically begin playback of one of the media titles at a designated insertion point, typically a clip that has been editorially or algorithmically deemed to be an "interesting moment" from the piece of content being merchandised, providing a user with a preview of the title. The insertion point itself may be selected as an interesting point in a given title, and therefore, likely to engage a user in that title.

Further, the interface may allow the user to switch from one title to another, and when doing so, the interface begins playback of another title at a designated insertion point associated with that title. For example, assume a user selects a category designated for "mystery" movies, in such a case, the client device may identify a list of mystery media titles and automatically begin streaming one of the titles on the list—at a designated insertion point. The streaming may occur within a portion of an available display area or "full-screen," based on user preferences or interface defaults; when "full-screen" the user can watch the interesting moment with or without a navigation GUI laid over a portion of the video. If the user changes to another title, the interface then automatically begins streaming the next title—also at a designated insertion point. Thus, this approach creates an effect similar to changing channels on broadcast television, but does in a manner where each change results in a new title being streamed from a designated insertion point. By providing a more engaging experience in this manner, users may be more likely to use a media streaming service.

The interface may allow the user to continue viewing a title being previewed from an insertion point as well as allow the user to jump to the beginning of such a title. In one embodiment, the insertion points themselves may be designated by individuals reviewing each available title. However, insertion points may also be generated algorithmically, e.g., based on statistics associated with the media titles. For example, if reviewing individuals tend to designate a first insertion point in comedy films at a point between 5-7 minutes from the beginning, then this could be used as a default insertion point for other comedy titles. Similarly, if users tend to jump to a certain time index in an individual media title (or category of titles), an insertion point may be generated at such time index.

Further, one title may have multiple insertion points. For example, insertion points may be categorized as being, e.g., "family friendly" or "violent," and such metadata could be used to select one insertion point over another, e.g., by picking the "family friendly" one in response to a user preference to limit auto play preview to such insertion points or by picking a particular type of clip based on time of day. Further, the provider may maintain a record of what titles (and what insertion points) have recently been previewed by a given user—in such a case, if a given title is previewed from one insertion point, then that same insertion point is not used a second time for a specified time period—allowing the insertion points to maintain a level of freshness, as opposed to simply replaying the same selections time and time again.

Note, the following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

FIG. 1 illustrates an example computing infrastructure 100 used to provide streaming media to a variety of client systems $\mathbf{130}_{1\text{-}2}$, according to one embodiment of the invention. As shown, the computing infrastructure 100 includes a streaming media server system 105, and a plurality of client systems $\mathbf{130}_{1\text{-}2}$, each connected to a communications network 120.

Each of the client systems $\mathbf{130}_{1\text{-}2}$ communicates with the streaming media server system 105 over the network 120 to view streaming media titles. In this particular example, client system $\mathbf{130}_1$, represents a computer system running a web-browser 132. Accordingly, client system $\mathbf{130}_1$ is representative of desktop PCs, laptop computers, home-theater PCs (HTPCs), tablet computers, and other computing systems capable of running a web-browser. In such a case, the web-browser 132 is configured to render web pages served from the media server 105. Such pages may allow users to select titles to view, manage a user account, as well as initiate an autoplay preview mode, as described in greater detail below. Media server 105 provides a computing system configured to transmit media streams to clients $\mathbf{130}_{1\text{-}2}$. For example, media server 105 may provide a web-server configured to respond to requests for web pages received from web-browser 132.

Similarly, client system $\mathbf{130}_2$ represents a set-top device connected to both network 120 and a display 140 (e.g., a flat-panel television). Accordingly, client system $\mathbf{130}_2$ is representative of digital cable boxes, digital video recorder (DVR) systems, and other specialized streaming media devices, as well as DVD players capable of connecting to a network 120 and receiving and playing back media streams provided by media server 105. For example, some Blu-ray® disc players can download and execute BD-live applications. In such a case, the disc player could connect to the media server 105 and download interface components used to select and playback media streams. Further, display 140 may itself be an integrated device capable of connecting to the network 120 playing back media streams supplied by the media server 105. For example, some flat-panel television displays include integrated firmware components used to connect to a variety of media server system 105 (e.g., various streaming media services, video on demand services, or popular video sharing websites). In each of these cases, a user interface presented by the client device may allow users to initiate an autoplay preview mode, where titles are streamed automatically, beginning from a designated insertion point.

Figure 2:
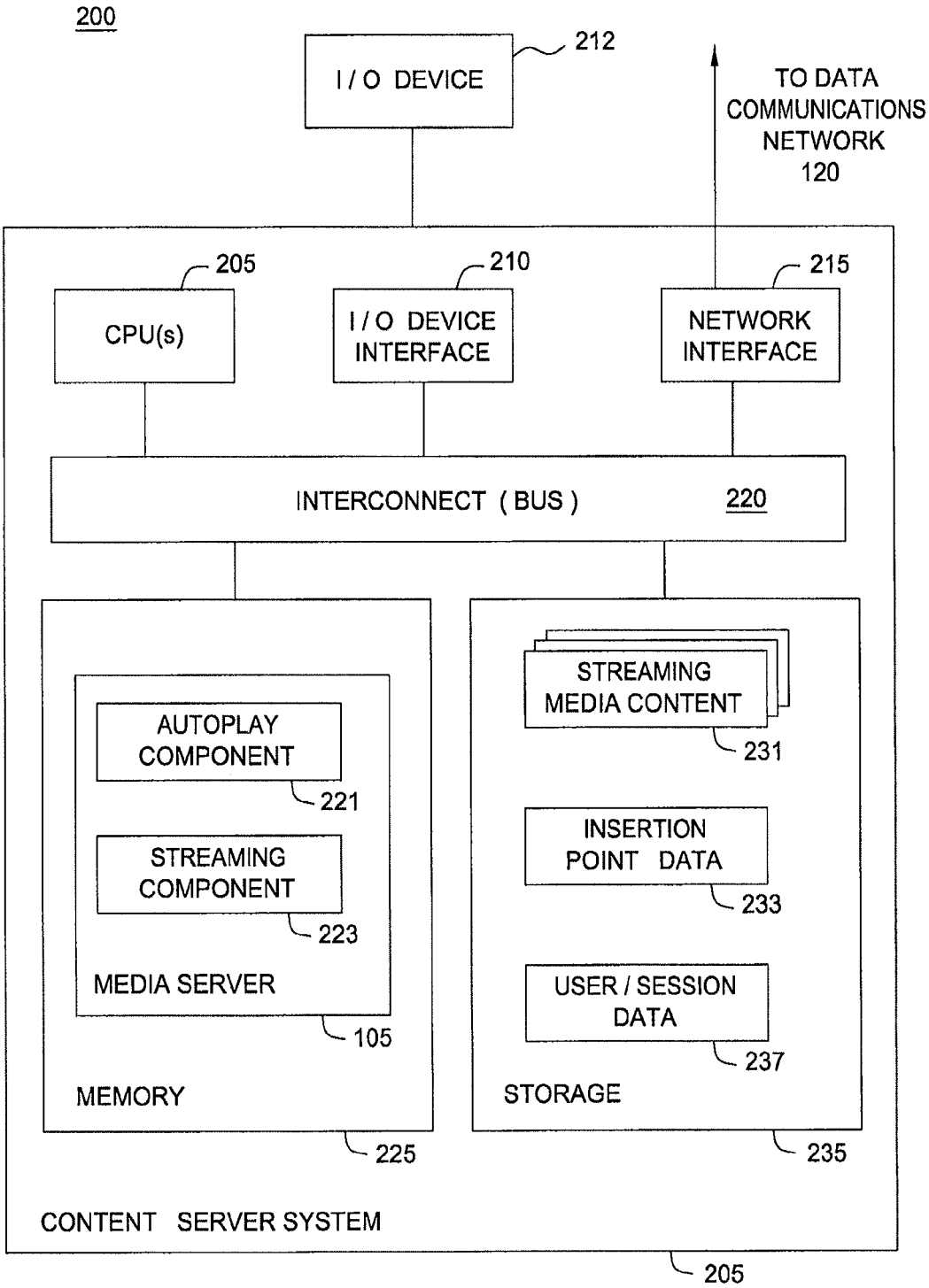
FIG. 2 illustrates an example computing system used to provide a streaming media server, according to one embodiment of the invention.

FIG. 2 illustrates an example computing system used to provide a streaming media server 105, according to one embodiment of the invention. As shown, a content server system 205 includes, without limitation, a central processing unit (CPU) 205, a network interface 215, an interconnect 220, a memory 225, and storage 230. The content server 105 also includes an I/O device interface 210 (e.g., keyboard, display and mouse devices).

CPU 205 retrieves and executes programming instructions stored in the memory 225. Similarly, CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards, or optical storage, network attached storage (NAS), or a storage area-network (SAN).

Illustratively, the memory 225 includes a media server 105, which itself includes an autoplay component 221 and a streaming component 223, and storage 230 includes streaming media content 231, insertion point data 233, and user/session data 237.

Media server 105 provides a software application configured to stream media titles (i.e., streaming media content 231) in response to requests from clients (e.g., client systems 130 of FIG. 1). In one embodiment, the media server 105 may receive a request from a client to begin previewing titles using an autoplay feature. In response, the autoplay component 105 may determine a list of streaming media titles to stream to the requesting client. The list of titles may be based on a user specification of a content category (e.g., a request to preview action-adventure titles). Of course, a variety of approaches could be used to determine a list of titles, e.g., based on a user's prior viewing choices, demographic profiles, or even at random. The insertion point data 233 stores insertion points for the autoplay feature for the titles made available by streaming media content 231. Each such insertion point generally corresponds to a frame of video in a streaming media title. During the brief time that the video pre-buffers, the user sees a freeze frame of either the first frame of the clip or a particularly arresting image from early in the clip.

Once the autoplay component 221 determines a list of media titles, the streaming component 223 may begin streaming one of them to the client at a designated insertion point. Additionally, the autoplay component 221 may store an indication of what streaming media titles and what insertion points have been used to stream media content to a client as part of a given viewing session (represented in FIG. 2 as user/session data 237). Doing so allows the media server to avoid streaming the same title and/or insertion point to a client as part of a given viewing session.

Figure 3:
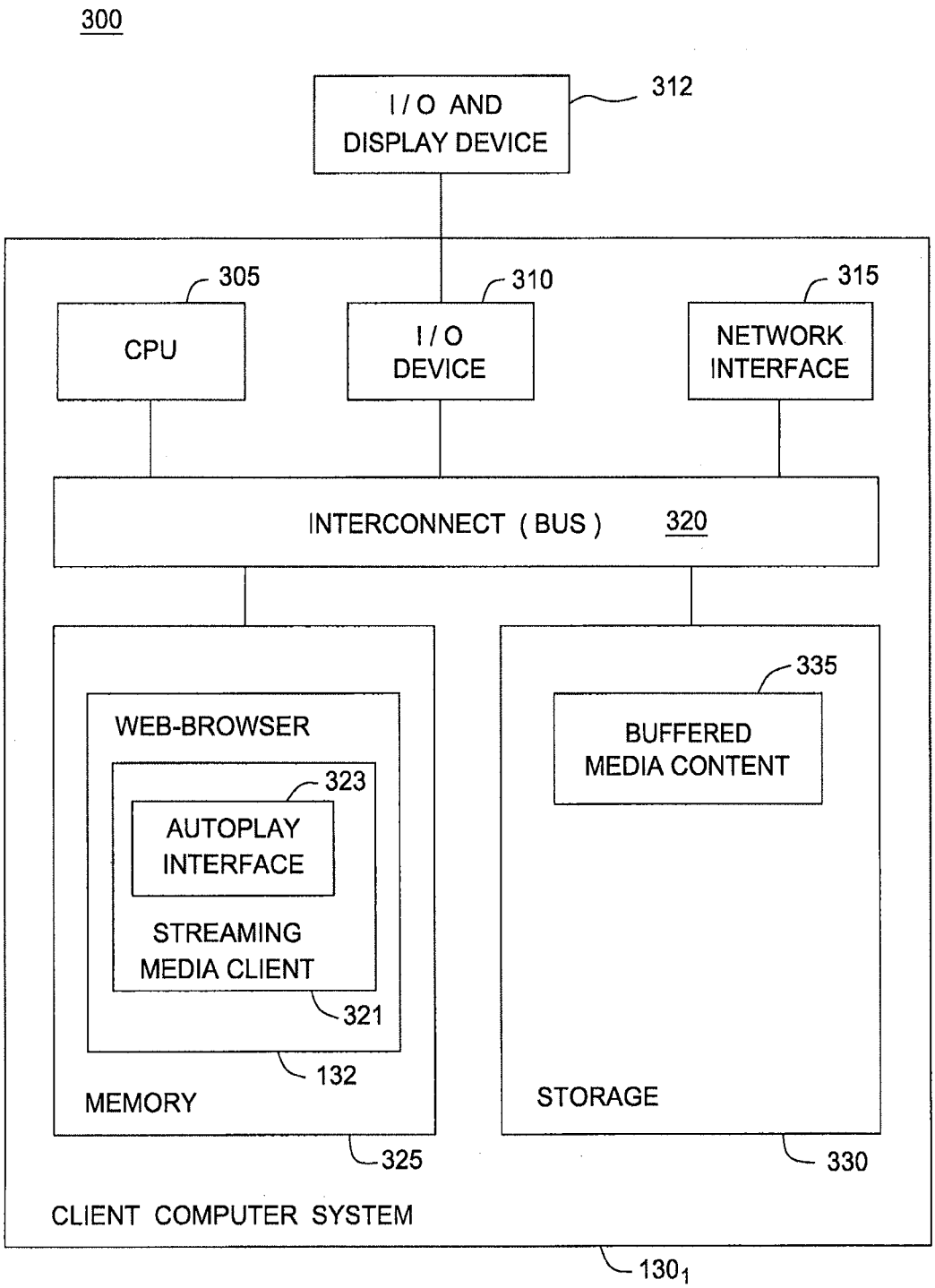
FIGS. 3-4 illustrate examples of client devices used view streaming media content, according to one embodiment of the invention.

FIG. 3 illustrates an example of a client computing system 130, used view streaming media content, according to one embodiment of the invention. As shown, the client computing system 130 includes, without limitation, a central processing unit (CPU) 305, a network interface 315, an interconnect 320, a memory 325, and storage 330. The computing system $\mathbf{130}_1$ may also include an I/O devices interface 310 connecting I/O devices 312 (e.g., keyboard, display and mouse devices) to the computing system $\mathbf{130}_1$.

Like CPU 205, CPU 305 is included to be representative of a single CPU, multiple CPUs, a single CPU having multiple processing cores, etc., and the memory 325 is generally included to be representative of a random access memory. The interconnect 320 is used to transmit programming instructions and application data between the CPU 305, I/O devices interface 310, storage 330, network interface 315, and memory 225. The network interface 315 is configured to transmit data via the communications network 120, e.g., to stream media from the server system 105, as well as to receive and present ads 112 from the ad server system 110. Storage 330, such as a hard disk drive or solid state (SSD) storage drive, may store non-volatile data.

Illustratively, the memory 325 includes a web browser 132, which itself includes an streaming media client 321 and an autoplay interface 323. And the storage 330 stores buffered media content 335. As is known, the browser 132 provides a software application which allows a user to access web pages and other content hosted by a server. In context of the present disclosure, the streaming media client 321 corresponds to components of browser 132 used to playback streaming media content stored on client system $\mathbf{130}_1$ as buffered media content 355. For example, streaming media client 321 may be configured to playback media streams packaged as an Adobe® Flash® file, a Microsoft® Silverlight® package, or an HTML5 object.

Additionally, the streaming media client 321 may also provide an autoplay interface 323 configured to provide a user with a preview of a variety of different titles, where each title begins streaming from a designated insertion point. When the user switches from one streaming media title to another, the autoplay interface may discontinue streaming a first title and begin streaming a second title at a designated insertion point associated with the second title. An example of such an interface is described below in conjunction with FIG. 7. Of course, other approaches may be used to allow the client system $\mathbf{130}_1$ to render a user interface, as well as to provide the autoplay interface 323.

Figure 4:
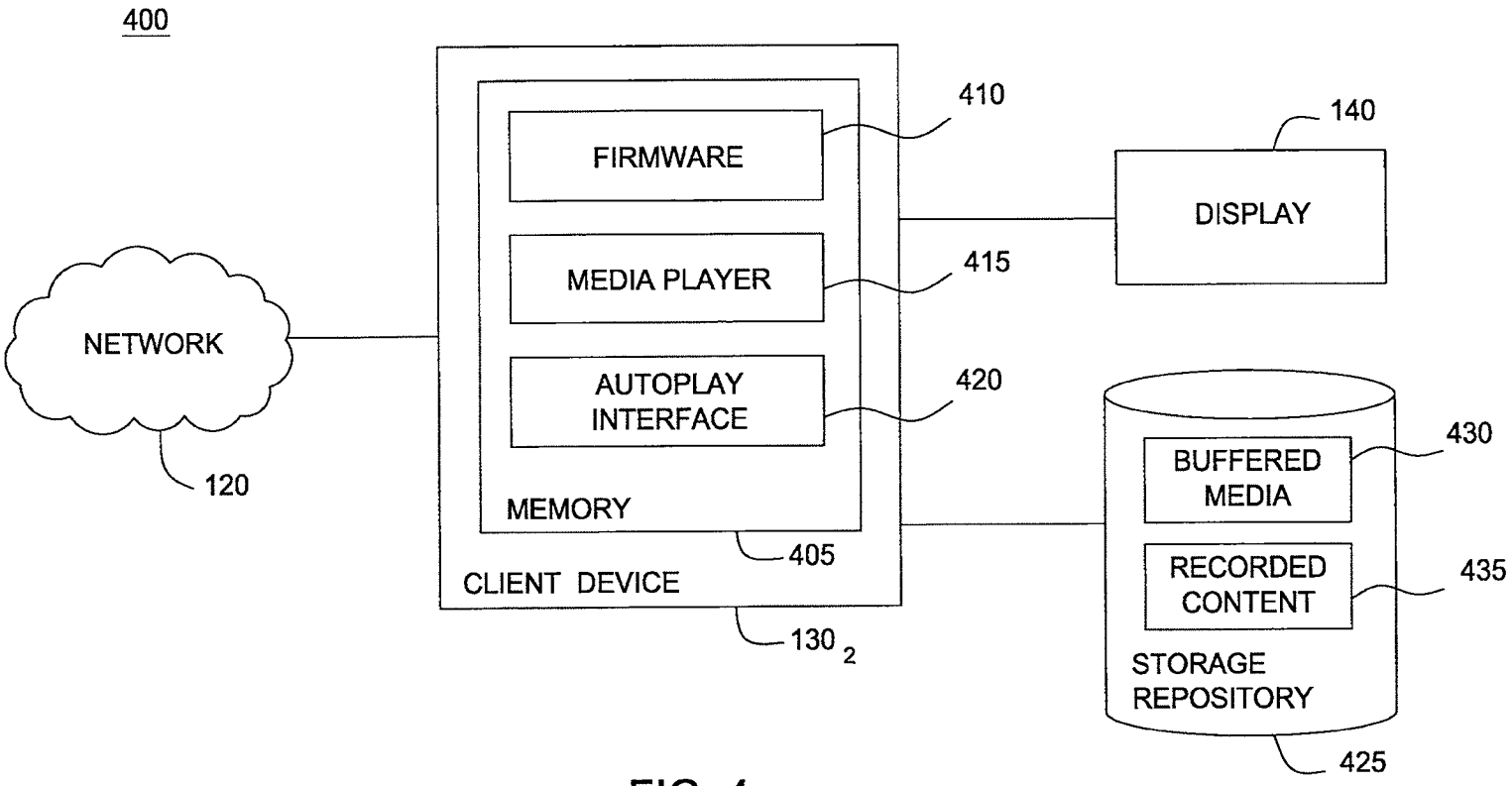

FIG. 4 illustrates an example of a client device $\mathbf{130}_2$ used view streaming media content, according to one embodiment of the invention. In this example, a streaming media client device is connected to both a display screen (e.g., a flat panel television) and a network. Accordingly, as shown, the client device $\mathbf{130}_2$ is connected to both a network 120 and to a display 140. Note, client device $\mathbf{130}_2$ is included to be representative of a cable-set top box, a digital video recorder (DVR) device or a cable set-top box with integrated DVR functionality, as well as dedicated streaming devices, e.g., the Roku® device used to stream media content from a variety of different service providers. Thus, set-top box 136 is also shown connected a storage repository of recorded content 425, representing locally stored content that is available for playback on display 140.

In one embodiment, the client device $\mathbf{130}_2$ is configured to present media content streamed over network 120 using an autoplay interface 415. As shown, the client device $\mathbf{130}_2$ itself includes firmware 410, a media player 415, buffered media store 430 and the autoplay interface 420. The firmware 405 represents the operating logic used to control the client device $\mathbf{130}_2$. For example, the firmware 405 may be configured to allow users to schedule recordings, connect to streaming media services, select content for playback, as well as preview titles using the autoplay interface 420. Streaming media content retrieved over the network 120 may be stored in buffered media store 435. Media player 415 provides software on the client device $\mathbf{130}_2$ configured to playback content streamed over the network 120 (whether as part of the autoplay interface or otherwise) or playback content from recorded content 435.

Figure 5:
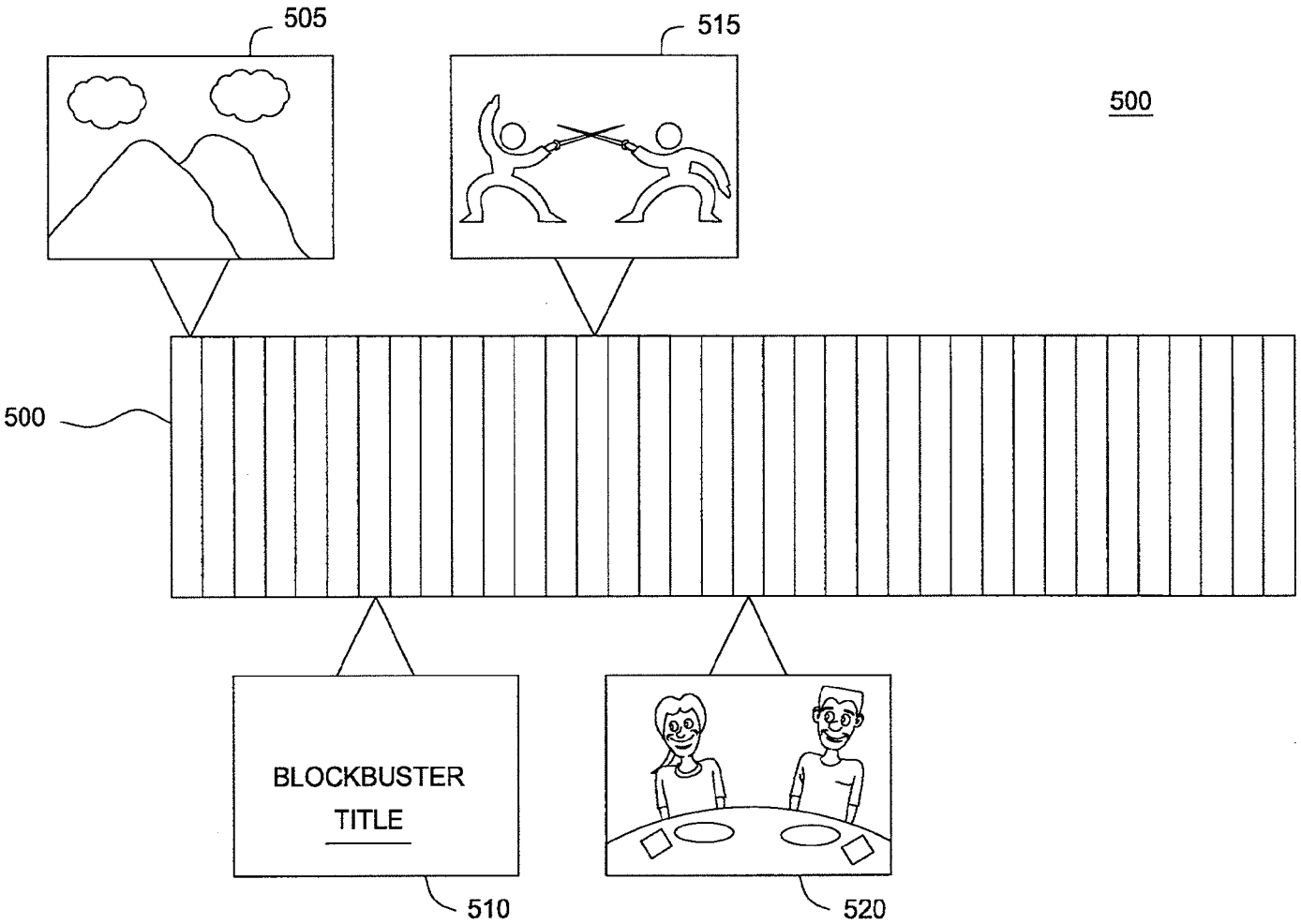
FIG. 5 illustrates an example streaming media file with multiple insertion points used by an autoplay feature, according to one embodiment of the invention.

FIG. 5 illustrates an example streaming media title 500 with multiple insertion points (505-520) used by an autoplay feature, according to one embodiment of the invention. As shown, the streaming media title 500 is divided into a sequence of frames. In this example, frames 505 and 510 may be poor candidates for insertion points, as the initial frame 505 shows a logo for a film production studio and frame 510 shows the name of the media title 500. Neither of frames 505 and 510 may be particularity engaging to the user. In contrast frame 515 shows a frame relatively early in the title 500, where two individuals are fighting one another. Similarly, frame 520 shows a frame in title 500 where two individuals are have just sat down for a meal. Both frames 515 and 520 may be more engaging to a user than frames 505 or 510. Accordingly, frames 515 and 520 may be designated as insertion points for media title 500. Further, insertion point 515 and 520 may be assigned metadata characterizing the insertion points, e.g., as being "family-friendly" in the case frame 520 or "violent" in the case of frame 515. Such metadata may be used to help select insertion points for users in certain scenarios (e.g., where a user has expressed preferences to only show "family friendly" insertion points). Of course, a variety of other categorizations, characterizations, or other descriptions may be specified for a given media title and/or insertion point and used to assist in selecting what insertion point is used to begin streaming a given title to a user as part of an autoplay interface.

Figure 6:
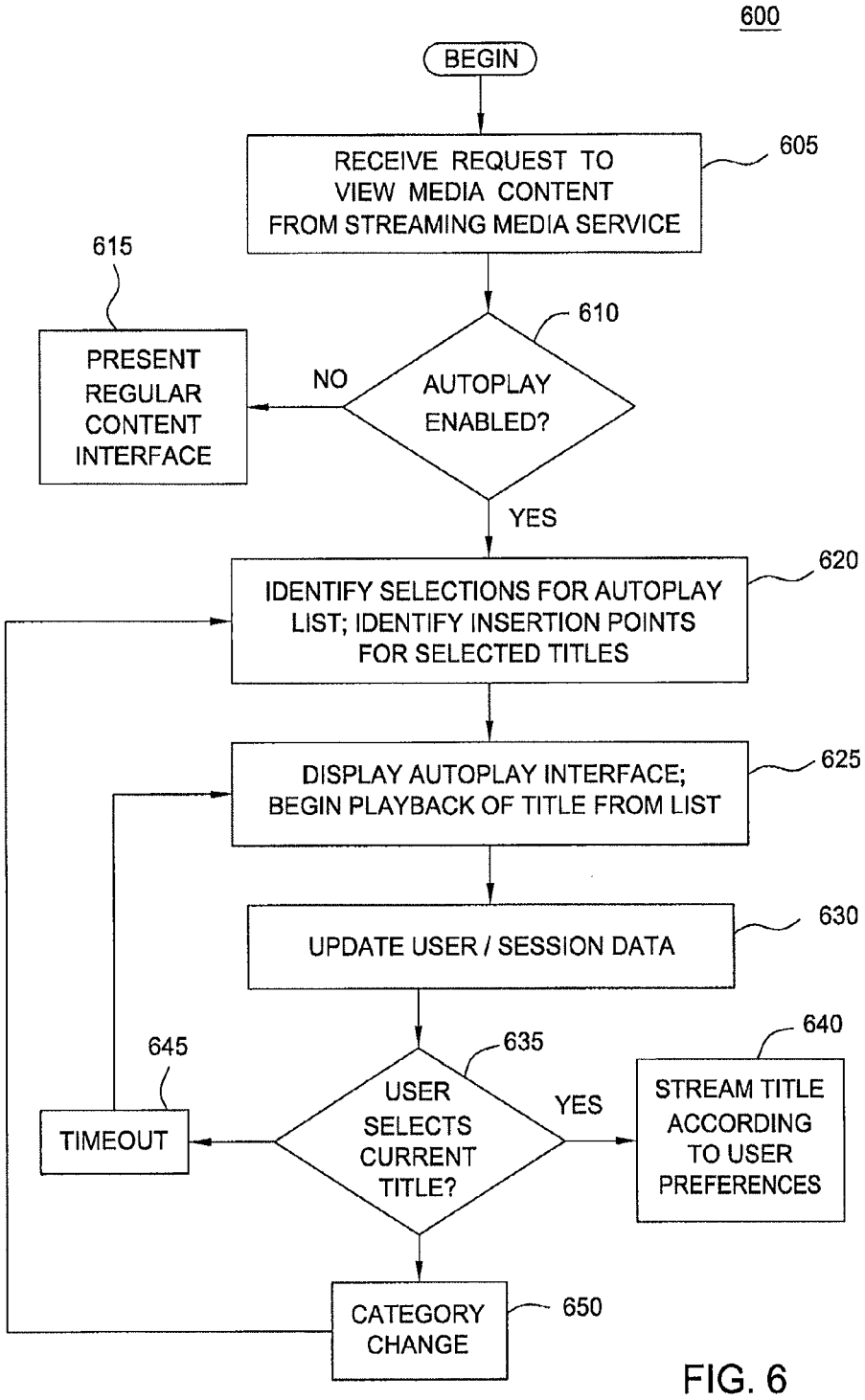
FIG. 6 illustrates a method for presenting streaming media content on a client device using an autoplay feature, according to one embodiment of the invention.

FIG. 6 illustrates a method 600 for presenting streaming media content on a client device using an autoplay feature, according to one embodiment of the invention. As shown, the method 600 begins at step 605, where a streaming media server receives a request to view media content. For example, as noted above, the request may be made by a user interacting with a web-browser or other application software on a computer (e.g., an HTPC), or interacting with a set-top box or a DVR device (or a device integrating components thereof). In one embodiment, the requested media content is streamed over a network to the client device, stored in a buffer, and then played back to the user.

At step 610, the streaming media server may receive an indication whether the user has selected to preview titles using an autoplay interface. For example, the user may enable the autoplay feature using the interface provided by the client device. If not enabled, then at step 615, the user is presented with a regular interface provided for selecting streaming media titles. However, if the autoplay interface is enabled, then at step 620, the media server identifies selections for an autoplay list. As noted, the list of titles may be based on a user specification of a content category (e.g., a request to preview action-adventure titles), or on a user's prior viewing choices, demographic profiles, or at random, etc. Once the list of media titles are identified, the streaming media server may identify an insertion point for each title in the list. As noted, each title may have multiple insertion points, and the streaming media server may select one based on, e.g., user preferences, past history, or other criteria.

At step 625, the client device displays the autoplay interface, and begins streaming playback of one of the titles from the list at the designated insertion point. Additionally, at step 630, the streaming media server may update the user/session data to reflect what streaming media title and insertion point was previewed to the user. At step 635, once media title has begun streaming on the client, the interface may wait for a specified period, allowing the user to confirm the selection of the current streaming media title. In such an embodiment, if the user selects to view the streaming media title presented currently being presented via the autoplay feature, the interface may switch to a full-screen mode and simply continue streaming the current media title. Alternatively, the interface may include a control which allows the user to jump to another point in the current title (e.g., the beginning). Otherwise, if the user does not confirm the selection of the current title, at 645, a timeout occurs. In such a case, the interface may begin playing another title from the list and begin playing the new title from the designated insertion point (returning to step 625).

In another embodiment, the interface may auto play a current title from an interesting point while allowing the user to continue browsing other available titles (e.g., when not presented in a full-screen mode). In such a case, the user can start any other title from an interesting moment while continuing to browse other titles. At the same time, the current title continues to play (from the insertion point) until the user decides to confirm to view the current title, restart it from the beginning, or jump to another title. Similarly, the interface may allow the user to cycle from one streaming media title to another. In such a case, the user may switch from streaming a first title and begin streaming a second title at a designated insertion point associated with the second title. Note, in an alternative embodiment, the interface could also allow the user could to switch from one insertion point to another within the same title. Further, the user may also change the category of titles being previewed using the autoplay feature. Accordingly, at 650, if a category change occurs, then the streaming media server determines a new list of selections to preview to the user (step 620), selects an insertion point for one of the titles from the new list and begins streaming it from the designated insertion point (step 625). This process may repeat until the user selects a title for viewing.

Figure 7:
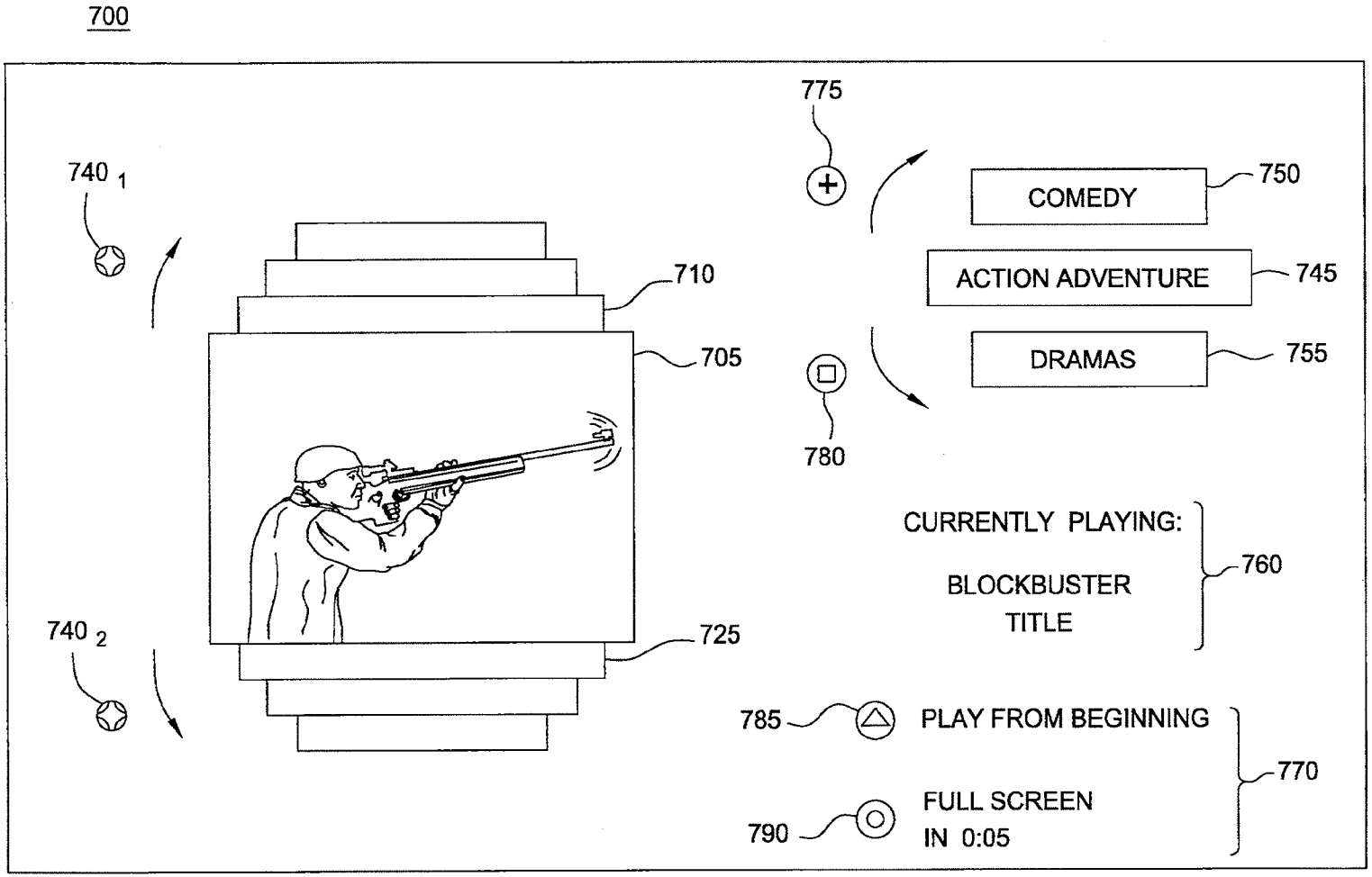
FIG. 7 illustrates an example rendering of an autoplay interface on a streaming media client device, according to one embodiment of the invention.

FIG. 7 illustrates an example rendering of an autoplay interface 700 on a streaming media client device, according to one embodiment of the invention. In this example, a user is currently previewing an "action-adventure" title 705 in a display window of the interface 700. The user may switch from the title 705 to a preview of title 710 using an interface button $\mathbf{740}_1$, i.e., by pressing an "up" button on a control pad. Similarly, the user may switch to a preview of title 725 using an interface button $\mathbf{740}_2$, i.e., by pressing a "down" button on the control pad. The user may continue cycling through other "action adventure" titles in a similar manner.

Illustratively, the interface 700 allows the user to change categories from the "action-adventure" categories to either a "comedy" category 750 using an interface button 775 or a "dramas" category 755 using an interface button 780. If the user selects to change categories, then the interface 700 would identify a new list of titles to stream to the client device, and begin streaming one of them at a designated insertion point.

The interface 700 also allows a user to confirm the selection of the title being previewed using controls 770. As shown, the user can either play from beginning or switch to a full-screen mode using interface controls 785, 790. In this example, the controls 770 also show a countdown timer. If the timer expires, without any further user input-then the interface 700 may switch to a full-screen mode and continue streaming the currently selected media title.

Thus, advantageously, embodiments of the invention provide techniques for presenting streaming media content to users in an engaging manner. In one embodiment, a user-interface on a content-publisher website (or interface provided by a cable set-top-box or DVR) may include a control that allows the user to select to begin previewing available titles in an autoplay mode. For example, in one embodiment, a streaming media player may provide an interface that allows users to browse though a collection of available titles sorted into different categories (e.g., science fiction titles, television shows, westerns, etc.). The interface may be configured to automatically begin playback of one of the media titles at a designated insertion point, providing a user with a preview of the title. The insertion point itself may be selected as an interesting point in a given title, and therefore, likely to engage a user in that title.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A computer-implemented method [for delivering streaming media content to a client device], the method comprising:

identifying a [selection] *first set* of media titles to present [to a user as previews via an autoplay interface presented] on [the] *a* client device;

identifying, for a first [one] *media title included in the first set* of [the] media titles, a first insertion point that specifies a *first* frame from which to begin streaming the first media title to the client device [via the autoplay interface, wherein the first insertion point is selected from one or more insertion points];

streaming the first media title to the client device beginning from the first insertion point, wherein the [autoplay interface begins playback of the streamed] first media title [without requiring user selection of the first media title] *is configured for automatic playback on the client device beginning from the first insertion point*;

recording an indication that [selected first insertion point has been used to preview] the first media title *has been previewed* on the client device *via the first insertion point*;

identifying a second [selection] *set* of media titles to present [to the user as previews via the autoplay interface presented] on the client device, wherein the second [selection] *set* of media titles *also* includes the first media title; [and]

*based on the indication, determining that the first media title has already been streamed to the client device beginning from the first insertion point;*

*identifying, for the first media title, a second insertion point that specifies a second frame from which to begin streaming the first media title to the client device, wherein the second insertion point is different than the first insertion point; and* streaming the first media title to the client device *beginning* from [a] *the* second insertion point [wherein the second insertion point is different than the first insertion point].

2. The computer-implemented method of claim 1, further comprising:

receiving a request to switch from the first media title to a second [one] *media title included in the first set* of the media titles;

identifying [an insertion point], for the second media title, *a third insertion point* that specifies a *third* frame from which to begin streaming the second media title to the client device [via the autoplay interface]; and streaming the second media title to the client device *beginning* from the *third* insertion point [for the second media title].

3. The computer-implemented method of claim 1, wherein the [selection] *first set* of media titles is determined from [user] specified preferences.

4. The computer-implemented method of claim 1, wherein the [autoplay interface] *client device* is configured to play the first media title in a full-screen mode.

5. The computer-implemented method of claim 1, wherein the [autoplay interface] *client device* is configured to play the first media title in a windowed mode.

6. The computer-implemented method of claim 1, wherein the client device [is] *comprises at least* one of a cable set-top box, *a* personal computer, and a digital video recorder.

7. A non-transitory computer-readable storage medium *for* storing [code for execution by a central processing unit (CPU), wherein the code] *instructions that*, when executed by [the CPU, performs] *a processor, cause the processor to perform* an operation [for delivering streaming media content to a client device], the operation comprising:

identifying a [selection of a plurality] *first set* of media titles to present [to a user via an autoplay interface presented] on [the] *a* client device;

identifying, for a first [one] *media title included in the first set* of [the] media titles, a first insertion point that specifies a *first* frame from which to begin streaming the first media title to the client device [via the autoplay interface, wherein the first insertion point is selected from one or more insertion points];

streaming the first media title to the client device beginning from the first insertion point, wherein the [autoplay interface begins playback of the streamed] first media title [without requiring user selection of the first media title] *is configured for automatic playback on the client device beginning from the first insertion point*;

recording an indication that [selected first insertion point has been used to preview] the first media title *has been previewed* on the client device *via the first insertion point*;

identifying a second [selection] *set* of media titles to present [to the user as previews via the autoplay interface presented] on the client device, wherein the second [selection] *set* of media titles *also* includes the first media title; [and]

*based on the indication, determining that the first media title has already been streamed to the client device beginning from the first insertion point;*

*identifying, for the first media title, a second insertion point that specifies a second frame from which to begin streaming the first media title to the client device, wherein the second insertion point is different than the first insertion point; and* streaming the first media title to the client device *beginning* from [a] *the* second insertion point [wherein the second insertion point is different than the first insertion point].

8. The computer-readable storage medium of claim 7, wherein the operation further comprises:

receiving a request to switch from the first media title to a second [one] *media title included in the first set* of the media titles;

identifying [an insertion point], for the second media title, *a third insertion point* that specifies a *third* frame from which to begin streaming the second media title to the client device [via the autoplay interface]; and streaming the second media title to the client device *beginning* from the *third* insertion point [for the second media title].

9. The computer-readable storage medium of claim 7, wherein the [selection] *first set* of media titles is determined from [user] specified preferences.

10. The computer-readable storage medium of claim 7, wherein the [autoplay interface] *client device* is configured to play the first media title in a full-screen mode.

11. The computer-readable storage medium of claim 7, wherein the [autoplay interface] *client device* is configured to play the first media title in a windowed mode.

12. The computer-readable storage medium of claim 7, wherein the client device [is] *comprises at least* one of a cable set-top box, *a* personal computer, and a digital video recorder.

13. A system, comprising:

a memory; and a processor storing one or more application programs, which, when executed on the processor, are configured to perform an operation for delivering streaming media content to a client device, the operation comprising:

identifying a [selection] *first set* of media titles to present [to a user via an autoplay interface presented] on [the] *a* client device, identifying, for a first [one] *media title included in the first set* of [the] media titles, a first insertion point that specifies a *first* frame from which to begin streaming the first media title to the client device [via the autoplay interface, wherein the first insertion points,]*;* streaming the first media title to the client device beginning from the first insertion point, wherein the [autoplay interface begins playback of the streamed] first media title [without requiring user selection of the first media title] *is configured for automatic playback on the client device beginning from the first insertion point;* recording an indication that [selected first insertion point has been used to preview] the first media title *has been previewed* on the client device[,] *via the first insertion point;* identifying a second [selection] *set* of media titles to present [to the user as previews via the autoplay interface presented] on the client device, wherein the second [selection] *set* of media titles *also* includes the first media title[, and]*;*

*based on the indication, determining that the first media title has already been streamed to the client device beginning from the first insertion point;*

*identifying, for the first media title, a second insertion point that specifies a second frame from which to begin streaming the first media title to the client device, wherein the second insertion point is different than the first insertion point; and* streaming the first media title to the client device *beginning* from [a] *the* second insertion point [wherein the second insertion point is different than the first insertion point].

14. The system of claim 13, wherein the operation further comprises:

receiving a request to switch from the first media title to a second [one] *media title included in the first set* of the media titles;

identifying [an insertion point], for the second media title, *a third insertion point* that specifies a *third* frame from which to begin streaming the second media title to the client device [via the autoplay interface]; and streaming the second media title to the client device *beginning* from the *third* insertion point [for the second media title].

15. The system of claim 13, wherein the [selection] *first set* of media titles is determined from [user] specified preferences.

16. The system of claim 13, wherein the [autoplay interface] *client device* is configured to play the first media title in a full-screen mode.

17. The system of claim 13, wherein the [autoplay interface] *client device* is configured to play the first media title in a windowed mode.

18. The system of claim 13, wherein the client device [is] *comprises at least* one of a cable set-top box, *a* personal computer, and a digital video recorder.

* * * * *